United States Patent
Baek et al.

(10) Patent No.: US 9,607,413 B2
(45) Date of Patent: Mar. 28, 2017

(54) METHOD AND APPARATUS FOR CREATING STRUCTURAL DRAWING

(71) Applicant: Samsung Electronics Co., Ltd., Suwon-si, Gyeonggi-do (KR)

(72) Inventors: Dusan Baek, Seoul (KR); Sunghoon Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 94 days.

(21) Appl. No.: 14/586,139

(22) Filed: Dec. 30, 2014

(65) Prior Publication Data
US 2015/0199829 A1    Jul. 16, 2015

(30) Foreign Application Priority Data

Jan. 10, 2014   (KR) ................. 10-2014-0003269

(51) Int. Cl.
| | |
|---|---|
| *G06T 15/00* | (2011.01) |
| *G06T 11/20* | (2006.01) |
| *G06F 17/50* | (2006.01) |
| *G06T 7/00* | (2017.01) |
| *G06K 9/00* | (2006.01) |
| *G06K 9/36* | (2006.01) |

(52) U.S. Cl.
CPC .......... *G06T 11/20* (2013.01); *G06F 17/5004* (2013.01); *G06K 9/00664* (2013.01); *G06T 7/0061* (2013.01); *G06F 2217/74* (2013.01); *G06K 2009/363* (2013.01); *G06T 2210/04* (2013.01); *G06T 2210/61* (2013.01)

(58) Field of Classification Search
None
See application file for complete search history.

(56) References Cited

U.S. PATENT DOCUMENTS

| | | | |
|---|---|---|---|
| 2004/0023190 A1* | 2/2004 | Rowles | G06F 3/0481 434/130 |
| 2005/0041100 A1* | 2/2005 | Maguire, Jr. | G06F 3/011 348/121 |
| 2011/0205365 A1* | 8/2011 | Kurosu | G01B 11/02 348/148 |
| 2012/0169868 A1* | 7/2012 | Bae | G01B 11/024 348/135 |
| 2013/0054685 A1 | 2/2013 | Yamamoto | |
| 2013/0055376 A1 | 2/2013 | Osada | |
| 2014/0267422 A1* | 9/2014 | Feyereisen | B64D 45/00 345/634 |
| 2015/0187138 A1* | 7/2015 | Mullins | G06K 9/00671 345/633 |

* cited by examiner

*Primary Examiner* — Ryan R Yang
(74) *Attorney, Agent, or Firm* — Jefferson IP Law, LLP

(57) ABSTRACT

A method and an apparatus for creating structural drawings and an electronic device adapted to the method are provided. The method includes setting a reference height for at least one wall, receiving image information regarding at least one wall, generating vectors for the wall of the image information, and generating a structural drawing based on one or more of the generated vectors.

21 Claims, 7 Drawing Sheets

METHOD AND APPARATUS FOR CREATING STRUCTURAL DRAWING

CROSS-REFERENCE TO RELATED APPLICATION(S)

This application claims the benefit under 35 U.S.C. §119(a) of a Korean patent application filed on Jan. 10, 2014 in the Korean Intellectual Property Office and assigned Serial number 10-2014-0003269, the entire disclosure of which is hereby incorporated by reference.

TECHNICAL FIELD

The present disclosure relates to a method and apparatus for creating structural drawings. More particularly, the present disclosure relates to a method and apparatus for creating structural drawings based on an image processing technology.

BACKGROUND

Electronic devices have recently been developed to be equipped with more enhanced software or hardware to provide more convenient functions to users according to user needs. Recent mobile devices supporting a camera function have provided various services by using information regarding images acquired by the camera. Image processing technologies for recognizing and editing have also been developed. The application technologies using the processed images have also been developed.

Recent electronic devices have been equipped with a technology for registering indoor structural drawings and controlling the indoor structural drawings. Systems according to some related art have received plan views or perspective views of structural drawings from architects or architectural firms and created the images that may be applied to a variety of fields. However, such systems according to the related art are disadvantageous because such systems cannot adaptively create indoor structural drawings. If indoor structures are modified, systems according to some related art cannot apply the modified structures to services.

For example, systems according to some related art can collectively process buildings constructed with the same structure, such as apartments, the like, or a combination thereof, by using the same plan views or structural drawings. However, if buildings constructed with the same structure are modified in such a way that the buildings have the modified structural drawings or buildings have been construction with different structure in such a way that the buildings have the structural drawings, systems according to some related art cannot provide services using structural drawings.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for creating structural drawings.

Another aspect of the present disclosure is to provide a method and apparatus for adaptively creating structural drawings based on image information.

Another aspect of the present disclosure is to provide a method and apparatus for creating individually structural drawing and setting or modifying a position for a device at a specific point.

In accordance with an aspect of the present disclosure, a method for creating a structural drawing in an electronic device is provided. The method includes setting a reference height for at least one wall, receiving image information regarding at least one wall, generating vectors for the wall of the image information, and generating a structural drawing based on one or more of the generated vectors.

In accordance with another aspect of the present disclosure, an electronic device for creating structural drawings is provided. The electronic device includes an image input unit configured to generate image information for at least one wall, and a controller. The controller is further configured to set a reference height for at least one wall. The controller is further configured to receive the image information regarding at least one wall. The controller is further configured to generate vectors for the wall of the image information and to generate a structural drawing based on one or more of the generated vectors.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments of the present disclosure includes an image input system and processes image data. The image input system may be a camera. Examples of the electronic device are a smartphone, a portable terminal, a mobile terminal, a Personal Digital Assistant (PDA), a Portable Multimedia Player (PMP), a note pad, a Wireless Broadband (Wi-Bro) terminal, a tablet Personal Computer (PC), a mobile medical device, an electronic bracelet, an electronic necklace, an appcessory, a camera, a wearable device, an electronic clock, a wrist watch, a home appliance (e.g., refrigerator, air-conditioner, vacuum cleaner, oven, microwave oven, washing machine, air-cleaner, and/or the like), an artificial intelligent robot, an electronic dictionary, a camcorder, the like, or a combination thereof. The electronic device may also be applied to various types of devices with an image input function.

Figure 1:
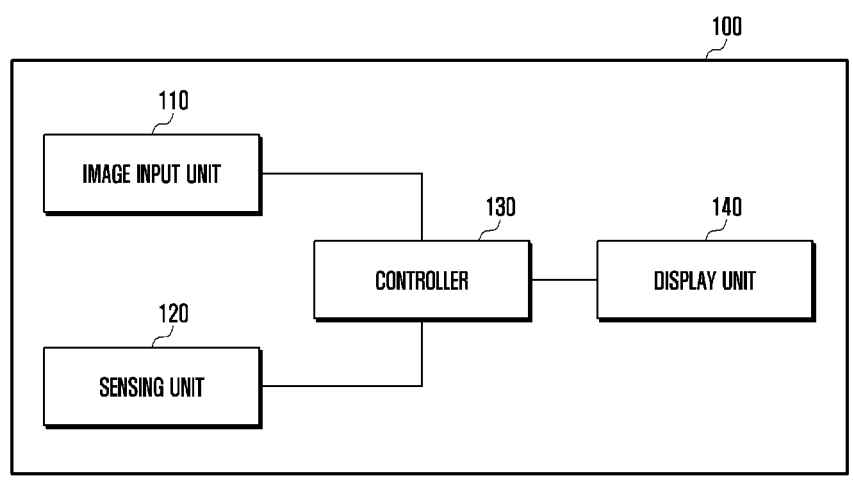
FIG. 1 illustrates a schematic block diagram of an electronic device according to an embodiment of the present disclosure.

FIG. 1 illustrates a schematic block diagram of an electronic device according to an embodiment of the present disclosure.

Referring to FIG. 1, the electronic device 100 may include an image input unit 110 for receiving image information, a sensing unit 120 for sensing data used to create a structural drawing, a controller 130 for processing data to create a structural drawing by using the received image data and the detected data, and a display unit 140 for displaying the detected data and the structural drawing.

The image input unit 110 may include a camera module that can receive continuous scene or non-continuous scene. The camera module is a device for capturing motion pictures and moving images and still images. The camera module may include one or more image sensors (e.g., front lens or rear lens), image signal processor, a flash Light Emitting Diode (LED), the like, or a combination thereof. In an embodiment of the present disclosure, image information acquired by the image input unit 110 may be information regarding a group of still images or moving images that can be processed in the format of panorama.

The sensing unit 120 may include at one of the following: a gesture sensor, gyro sensor, an atmospheric pressure sensor, a magnetic sensor, an acceleration sensor, a grip sensor, a proximity sensor, a Red Green Blue (RGB) sensor, a bio sensor, a temperature/humidity sensor, a luminance sensor, and an Ultraviolet (UV) sensor. The sensing unit 120 measures physical quantity, senses operation states of the electronic device, and converts the measured or sensed signals into electrical signals.

In an embodiment of the present disclosure, the sensing unit 120 may be an acceleration sensor. The sensing unit 120 may further include a geomagnetic sensor for sensing measurement information to create a structural drawing. The measurement information may include information related to acceleration, angle, relative direction, absolute direction, the like, or a combination thereof.

The controller 130 may control the operation of the electronic device 100 (e.g., the entire operation of the electronic device 100). The controller 130 may process the image information from the image input unit 110 and the measurement information from the sensing unit 120. The controller 130 may correct the received image information, extract effective data from the received image information (e.g., edges), or create a structural drawing based on the received data or extracted data. The controller 130 may extract vectors from the image information and create a structural drawing based on the extracted vectors. The controller 130 may show an image being captured and a structural drawing being generated. The controller 130 may also register a user's requesting information in a structural drawing. For example, the controller 130 may register a position of an appliance that the user specified at a specific point of a structural drawing.

In an embodiment of the present disclosure, the controller 130 may set a reference height for at least one wall, receive image information regarding at least one wall, extract vectors regarding the wall corresponding to the image information, and create a structural drawing based on the extracted vectors.

The controller 130 may extract a reference direction, a photographing direction, and lengths of segments of at least one wall, and create vectors based on the extractions.

The controller 130 may determine whether the currently receiving image information is image information regarding a reference wall to create a structural drawing. When the controller 130 ascertains that the currently receiving image information is image information regarding a reference wall to create a structural drawing, the controller 130 may create a structural drawing by combining vectors that has been extracted with each other. In contrast, when the controller 130 ascertains that the currently receiving image information is not image information regarding a reference wall to create a structural drawing, the controller 130 may store created vectors and extract vectors regarding a new wall.

The controller 130 may set a photographing height of a camera to the electronic device 100 and a reference height from the photographing height. The controller 130 may calculate the photographing height based on an acceleration acquired by an acceleration sensor.

The controller 130 may set the photographing height by using at least one of the following: a method for using an angle between the top and bottom of a wall from the photographing height, a method for using pixels from the photographing height to the top of a wall and to the bottom of a wall, and a method for using a ratio of a distance from the photographing height to the top of a wall to a distance from the photographing height to the bottom top of a wall.

The controller 130 may create a structural drawing by combining vectors regarding at least two walls adjoined to each other. The controller 130 may add position information regarding at least one object to the created structural drawing according to one or more user inputs.

The display unit 140 may display data required for the creation of a structural drawing and also the structural drawing. The display unit 140 may display information that a user wants to register at a specific point in the created structural drawing. If the display unit 140 is implemented with a touch panel, the display unit 140 may also serve as an input system for detecting one or more user touches.

In an embodiment of the present disclosure, the electronic device 100 may set a reference height starting from the height of the camera, recognize a wall by processing image information from the camera, and make a track. The electronic device 100 may create a structural drawing by moving along a wall using a User Interface (UI). During the process, the electronic device 100 may automatically add primary devices and places in the structural drawing by processing the images or particular point or a particular device's position that the user selects using a UI related to the structural drawing.

Although the electronic device 100 has been described above, explaining its components, it should be understood that the electronic device 100 is not limited to the components and may further include others.

Figure 2:
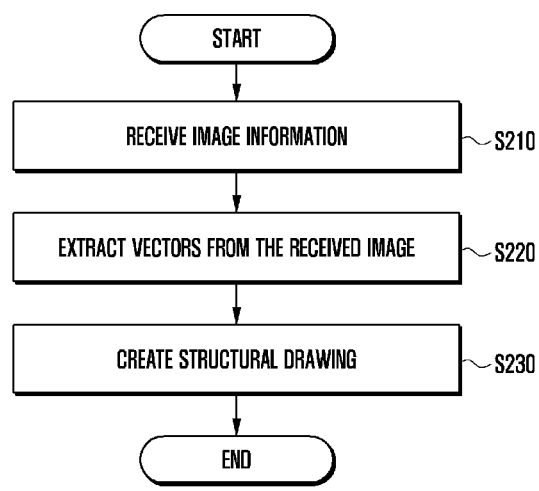
FIG. 2 illustrates a flow chart that describes a method for creating a structural drawing according to an embodiment of the present disclosure.

FIG. 2 illustrates a flow chart that describes a method for creating a structural drawing according to an embodiment of the present disclosure.

Referring to FIG. 2, the electronic device may start creating a structural drawing according to a user instruction. The electronic device may receive image information using the image input unit at operation S210. The image input unit may be a camera. The image information may include information regarding at least one surface. If the camera of the electronic device captures images of a subject (e.g., the inside of a building), the image information may be information regarding at least one wall. The following various embodiments of the present disclosure will be described based the acquisition of image information from walls inside a building and the creation of a structural drawing based on the acquired image information. It should be, however, understood that they are only illustrated as cases for creating an indoor structural drawing and should not limit the scope of the present disclosure.

The electronic device may extract vectors from the received image information at operation S220. The method for acquiring vectors may include processes of detecting edge components from received image information, and extracting all vector components of edges, with respect to a photographing direction and a reference length, from the detected edge components. The method for extracting vectors will be described in detail later.

The electronic device may create a structural drawing by using the extracted vectors at operation S230. The electronic device can create a structural drawing of a perspective view or a plan view by using vectors regarding at least one wall extracted at operation S220. The structural drawing may be created by combining vectors regarding at least two walls with each other. For example, the structural drawing of a perspective view or a plan view may be created in such a way that: vectors regarding Wall 1 and vectors regarding Wall 2 adjoined to Wall 1 is extracted; and the vectors is combined each other. In addition, the structural drawings of the interior of a building may be created by combining vectors regarding all the walls with each other in succession.

Figure 3:
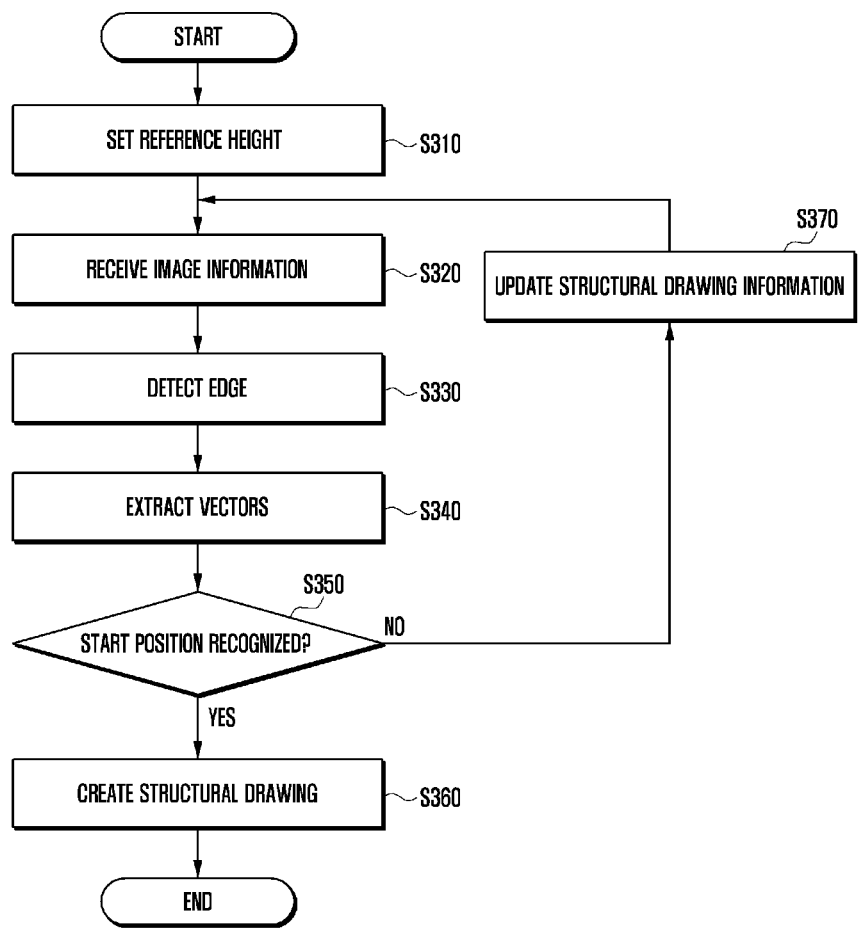
FIG. 3 illustrates a flow chart that describes a process for creating a structural drawing according to an embodiment of the present disclosure.

FIG. 3 illustrates a flow chart that describes a process for creating a structural drawing according to an embodiment of the present disclosure.

Referring to FIG. 3, the electronic device may set a reference length for at least one wall at operation S310. The reference length may be a reference height for a wall. The reference height may be measured by image information. The set reference height may serve as a reference value when extracting vectors.

The reference height may be measured in various methods (e.g., by using an angle at which image information is received, by using a ratio of pixels, the like, or a combination thereof). The reference height may be set to any value.

A method for setting a photographing height of a camera for receiving image information is described as follows. Although the photographing height does not need to be retained during the creation of a structural drawing, the photographing height may be used to measure a reference height. For example, a photographing height of a camera may be set by an acceleration sensor. A method for setting a photographing height by using an acceleration sensor is performed as follows. The electronic device moves from the bottom to a height so that the camera can capture images, and the displacement may be set to a photographing height. For example, while the electronic device is moving to the height to capture images by the camera, an instant acceleration detected by the acceleration sensor and a period of time for the displacement can be acquired and applied to the following Equation 1, thereby calculating the photographing height.

$$h_b = \int_0^t (\int_0^t a\,dt)dt \qquad \text{Equation 1}$$

In Equation 1, 'a' denotes acceleration, and 't' denotes time. For example, when the electronic device is accelerated to a velocity of 1 m/s for 1 second, the acceleration is 1 m/s$^2$. In that case, the reference height may be measured as 0.5 m. Because the motion of the electronic device may not be measured as a constant acceleration in real measurement, the photographing height of a camera may be measured by integrating instant accelerations at time points respectively. Although the embodiment of the present disclosure measures a photographing height of the electronic device by an acceleration sensor, it should be understood that the present disclosure is not limited to the embodiment of the present disclosure.

The method for setting a reference height is described as follows. A method for measuring a reference height by using an angle at which image information is received is described referring to FIG. 4.

Figure 4:
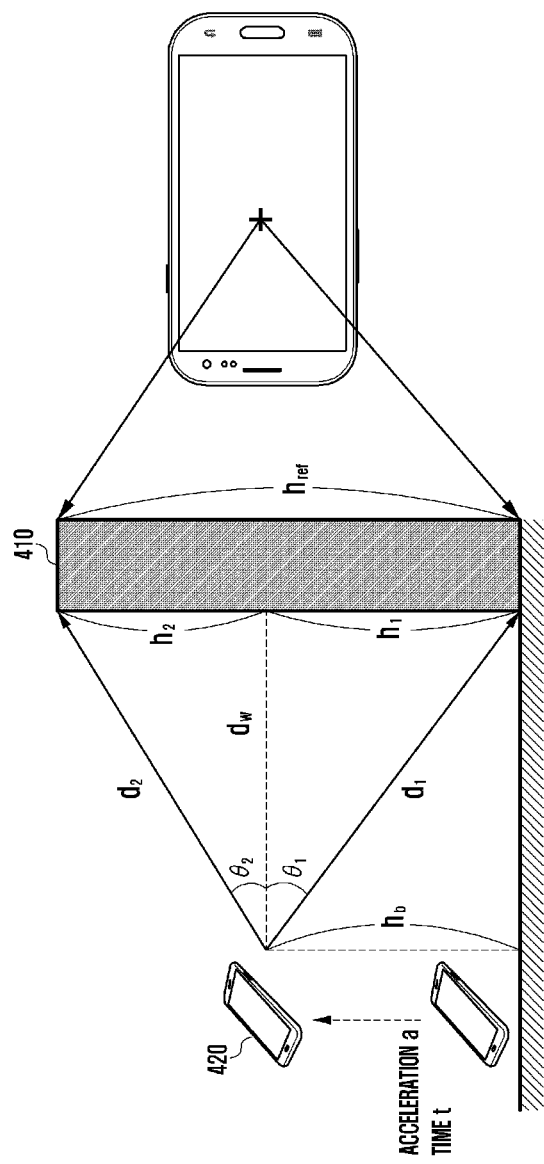
FIG. 4 illustrates a diagram that describes a method for measuring a reference height according to an embodiment of the present disclosure.

FIG. 4 illustrates a diagram that describes a method for measuring a reference height according to an embodiment of the present disclosure.

Referring to FIG. 4, a method for obtaining a reference height $h_{ref}$ of a wall 410 is described as follows. The electronic device 420 can capture an image of the wall 410 at the photographing height $h_b$ by the camera. The photographing height $h_b$ may be measured by the method described above, using the following Equation 2.

$$h_{ref} = h_1 + h_2 \qquad \text{Equation 2}$$

In Equation 2, $h_1$ denotes a length of the wall 410 from the bottom of the wall 210 to the position of the wall 210 corresponding to the photographing height $h_b$, and $h_2$ denotes a length of the wall 210 from the position of the wall 210 corresponding to the photographing height $h_b$ to the top of the wall 410. $H_{-2}$ may be equal to $h_b$.

Angles $\theta_1$ and $\theta_2$ may be measured by image information acquired by the electronic device. For example, the angles may be obtained by extracting edges from the received images. $\theta_1$ may be measured by a slope sensor in such a way that the bottom line of the wall 410 in the received image is set to the center of the UI in the electronic device and the slope sensor acquires the slope. Similarly, $\theta_2$ may be measured by a slope sensor in such a way that the top line of the wall 410 in the received image is set to the center of the UI in the electronic device and the slope sensor acquires the slope. Although the embodiment of the present disclosure measures the angles by using a slope sensor, it should be understood that the present disclosure is not limited to the embodiment of the present disclosure.

The shortest distance $d_w$ from the electronic device to the wall 410 may be measured by the following Equation 3.

$$d_w = \frac{h_1}{\tan\theta_1} \quad \text{Equation 3}$$

$h_2$, the length of the wall 210, may be measured by the following Equation 4.

$$h_2 = d_w * \tan\theta_2 \quad \text{Equation 4}$$

As described above, the reference height $h_{ref}$ may be measured by Equations 2 to 4.

In an embodiment of the present disclosure, the reference height $h_{ref}$ may be measured by a ratio of the upper portion of pixels to the lower portion of pixels. The photographing direction of the camera can be set to be perpendicular to the wall, referring to the slope of the UI of the electronic device. Thereafter, the top edge and bottom edge of the wall may be extracted from the image taking the wall in the perpendicular direction. The lengths from the position of the wall corresponding to the photographing height to the top edge and the bottom edge may be measured, respectively. The number of pixels from the position of the wall corresponding to the photographing height to the top edge (e.g., the number of top portion of pixels) and the bottom edge (e.g., the number of bottom portion of pixels) can be calculated by using lengths of the extracted top and bottom edges, respectively. Because the length from the position of the wall corresponding to the photographing height to the bottom edge of the wall is equal to the photographing height, the number of pixels can be set. In that case, the proportionality can be established by comparing the number of pixels from the position of the wall corresponding to the photographing height to the top of the wall with that from the position of the wall corresponding to the photographing height to the bottom of the wall, thereby measuring the reference height $h_{ref}$.

In an embodiment of the present disclosure, after the reference height $h_{ref}$ is set to any value, the following processes may be performed. In that case, a correct length as a fixed number cannot be acquired because the reference height is not set. However, the same ratio for all the extracted edges can be acquired, and thus used to create a structural drawing.

Referring back to FIG. 3, the electronic device receives image information at operation S320. The image information may be information regarding an image of at least one wall. Operations following S320 may repeat according to the determination of operation S350. If the received image information is an image of a first wall to create a structural drawing, the wall may be set to a reference direction Vref. Vectors may be created by using information regarding photographing directions Vn of images additionally collected with respect to the reference direction Vref, and may be used to create a structural drawing. Although the embodiment of the present disclosure measures the reference height href at operation S310, it should be understood that the present disclosure is not limited to the embodiment of the present disclosure. For example, the reference height href may be measured at operation S320. The photographing direction is used to extract vectors. The received image information is used to detect edges and to extract vectors in the following operations.

The electronic device detects edges from the received image information at operation S330. Edges may correspond to the lines of intersections of walls, between side walls, between a side wall and a floor, and between a side wall and a ceiling. Edges can be detected/extracted from image information in various methods (e.g., Sobel, Prewitt, Roberts, Compass, the second order differential and Laplacian, Canny, linear edge detection, the like, or a combination thereof). These edge detection methods will not be describe in the description.

The electronic device may extract vectors from the image information, based on the extracted edge information at operation S340.

Figure 5:
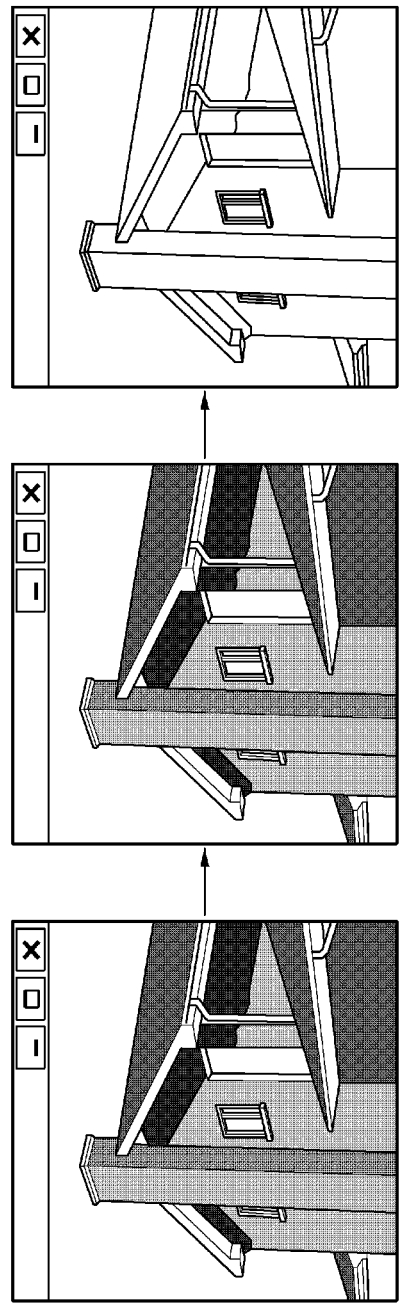
FIG. 5 illustrates diagrams that describe processes for extracting edge information according to an embodiment of the present disclosure.

FIG. 5 illustrates diagrams that describe processes for extracting edge information according to an embodiment of the present disclosure.

Figure 6:
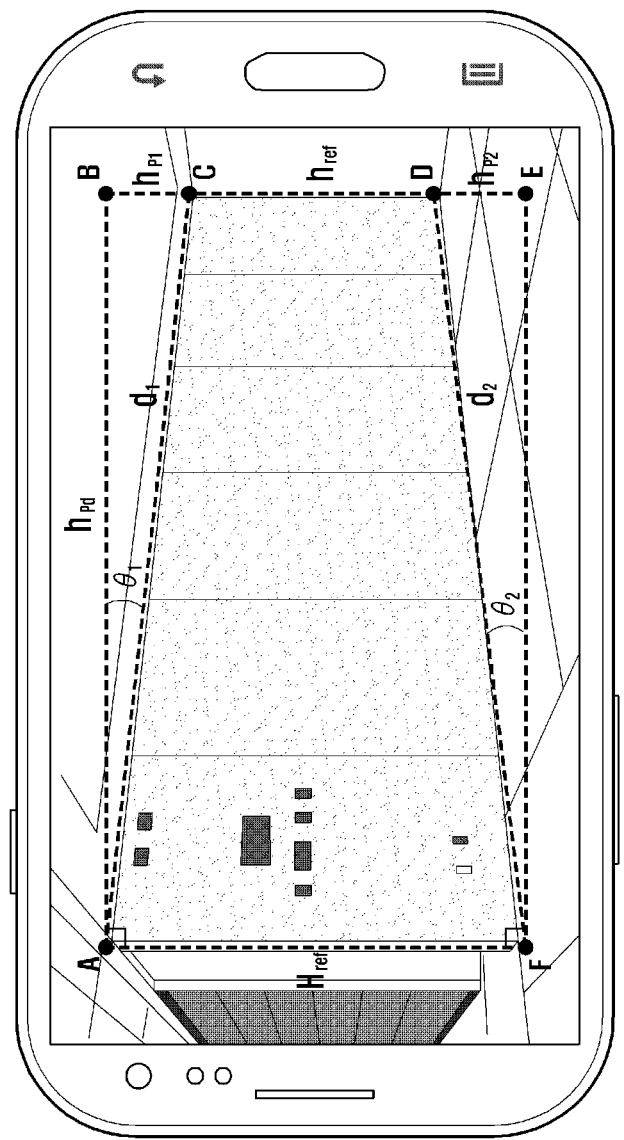
FIG. 6 illustrates a diagram that describes a method for extracting vectors according to an embodiment of the present disclosure.

The method for extracting vectors according to an embodiment of the present disclosure is described referring to FIG. 6.

FIG. 6 illustrates a diagram that describes a method for extracting vectors according to an embodiment of the present disclosure.

Referring to FIG. 6, the controller of the electronic device may extract information regarding edges of walls from received image information. The wall includes line segments AC (d1), CD (href), DF (d2), and AF (Href). The controller may extract edges of line segments AC, CD, DF, and AF, and recognize the wall. The controller may also extract information regarding virtual points B and E based on information regarding the extracted edges. The virtual point B is a point created by crossing a virtual line extended out from the line segment CD and a virtual line drawn from the point A perpendicular to the virtual line extending output from the segment CD. The virtual point E is a point created by crossing a virtual line extended out from the line segment CD and a virtual line drawn from the point F perpendicular to the virtual line extending output from the segment CD.

The real distance $H_{ref}$ is measured at operation S310. The real distance $H_{ref}$ is required to calculate a ratio of real distance $d_1$ to real distance d2 or a ratio of a relative length to the reference height, in order to create vectors for walls.

To do this, after extracting information regarding each point, the extracted information regarding one or more of each point is applied to the Pythagorean Theorem to extract lengths of the corresponding segments. The controller may extract relative coordinates of points A, B, C, D, E and F. When the extracted coordinates are applied to the Pythagorean Theorem, the lengths of the line segments, Href, href, d1, d2, hp1, hp2, and hpd may be extracted. In addition, ratios of the lengths of line segments may be obtained. When the ratio of length of line segment is compared with Href and href, the real distance of the wall may be extracted or the ratios of d1 and d2 to the reference height may be extracted.

In an embodiment of the present disclosure, the number of pixels of each line segment may be extracted based on pixel information regarding received image information. A ratio of relative lengths of line segments or the real distance may be extracted based on the number of pixels. For example, a ratio of lengths to hpd, hp1, hp2, and href may be obtained by using the number of pixels.

The controller may obtain θ1, θ2, d1, and d2 by the following equations.

$$\theta_1 = \tan^{-1}\frac{h_{p1}}{h_{pd}}, \theta_2 = \tan^{-1}\frac{h_{p2}}{h_{pd}} \quad \text{Equation 5}$$

$$d_1 = \frac{h_{pd}}{\cos\theta_1}, d_2 = \frac{h_{pd}}{\cos\theta_2} \quad \text{Equation 6}$$

As described above, the real lengths of edges of walls or ratios of lengths of walls may be obtained from received image information.

The controller may extract information regarding edges of each wall based on a reference direction Vref and photographing directions Vn. For example, the controller may create vectors by combining photographing directions Vn with respect to the reference direction Vref with the length information regarding extracted edge information with respect to the reference direction Vref.

The controller may store the vectors regarding edges of each wall created by the method above in the storage. The embodiment of the present disclosure may create a structural drawing by combining the vectors regarding each wall created as described above.

Referring back to FIG. 3, the controller of the electronic device determines whether image information currently received by the image input unit is at a beginning position to receive image information to create a structural drawing at operation S350. For example, when the electronic device re-receives image information regarding a first wall to create a structural drawing, the controller concludes that the electronic device reaches a begging position.

When the controller ascertains that currently received image information is at a beginning position at operation S350, the controller may create a structural drawing based on the vectors regarding at least one wall that is created at operation S360. The structural drawing may be a two or three dimensional structural drawing.

Figure 7:
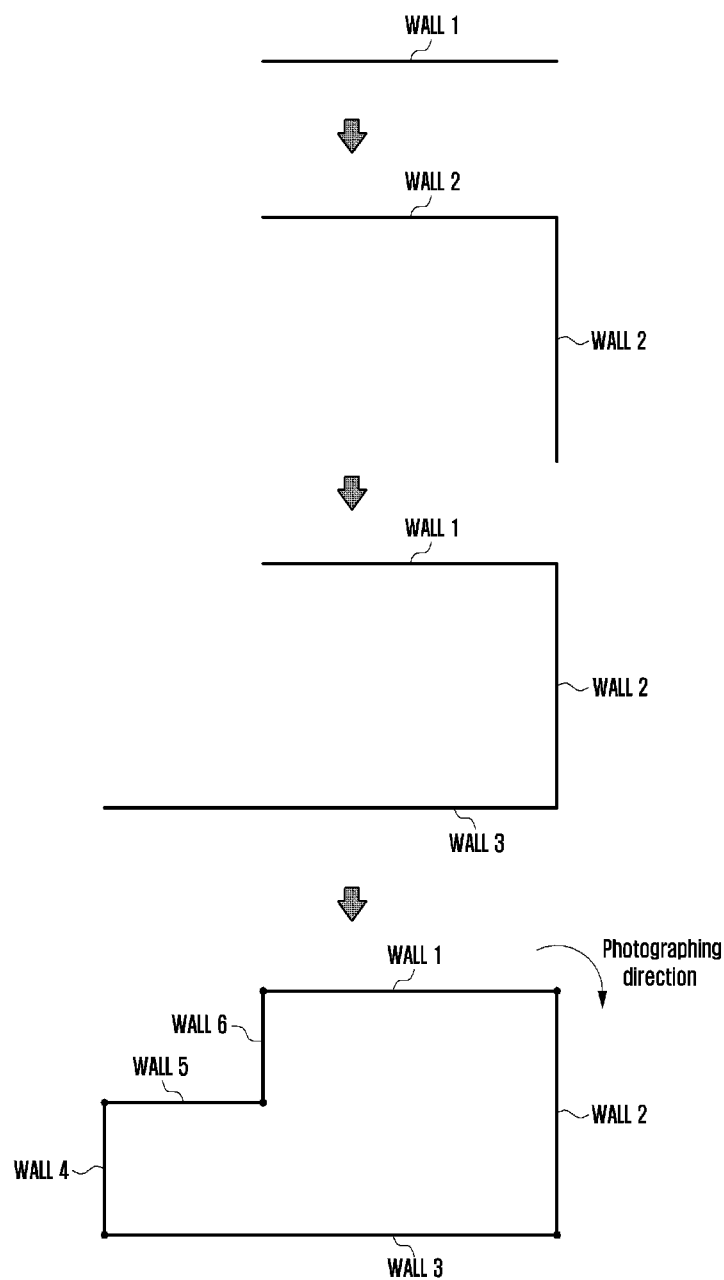
FIG. 7 illustrates diagrams that describe a structural drawing created according to an embodiment of the present disclosure.

FIG. 7 illustrates diagrams that describe a structural drawing created based on an embodiment of the present disclosure.

Referring to FIG. 7, a two-dimensional structural drawing according to an embodiment of the present disclosure is illustrated. The vectors regarding wall 1 may be information regarding a combination of the reference direction vref and the length information regarding wall 1. The vectors regarding wall 2 may be information regarding a combination of an angle or direction of wall 2, with respect to the reference direction vref, and the length information regarding wall 2. When combining vectors regarding wall 1 with vectors regarding wall 2, part or a structural drawing regarding walls 1 and 2 may be created. Similarly, when combining vectors regarding wall 2 with vectors regarding wall 3, part or a structural drawing regarding walls 1, 2 and 3 may be created. In addition, when combining vectors regarding wall 3 with vectors regarding the rest of walls, the structural drawings regarding all the walls may be created. When information regarding heights of walls may be added to the second dimensional structural drawing, part of the three dimensional information may be displayed. When information regarding heights of walls is combined with the second dimensional information, a three dimensional structural drawing may be created.

Referring back to FIG. 3, when the controller ascertains that currently received image information does not reach a beginning position at operation S350, the controller may store extracted vectors regarding at least one wall in the storage at operation S370 and returns to operation S320. The controller may perform operations S320 to S350 based on newly received image information. When the controller ascertains that currently received image information is at a beginning position at operation S350, the controller may create a structural drawing based on the vectors regarding a created wall at operation S360.

As described above, the method and apparatus according to the embodiments of the present disclosure can effectively create structural drawings.

The electronic device according to the embodiments of the present disclosure can recognize main devices and the places in a range of structural drawing by processing the images, and automatically add them to the drawing.

The electronic device can effectively add a main point and a position of a device in a structural drawing created according to a user's instructions.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for creating a structural drawing in an electronic device, the method comprising:
   setting a reference height for generating vectors for at least one wall;
   receiving image information on the at least one wall;
   detecting edges of the at least one wall based on the received image;
   generating vectors for the at least one wall based on the detected edges of the at least one wall and the reference height; and
   generating a structural drawing based on the generated vectors.

2. The method of claim 1, wherein the generating of the vectors comprises:
   extracting reference direction information and photographing direction information; and
   generating the vectors based on the reference direction information, the photographing direction information, and detected edges.

3. The method of claim 1, further comprising:
   determining whether the currently received image information is image information of a reference wall to generate the structural drawing.

4. The method of claim 3, further comprising:
   generating, in the event that the currently received image information corresponds to image information of the reference wall to generate the structural drawing, a corresponding structural drawing by combining vectors that have been generated with each other; and
   storing, in the event that the currently received image information does not correspond to image information of the reference wall to generate the structural drawing, the created vectors and creating vectors for a new wall.

5. The method of claim 1, wherein the setting of the reference height comprises:
   setting a photographing height at which the electronic device captures images; and
   setting the reference height from the photographing height.

6. The method of claim 5, further comprising:
   calculating the photographing height using an acceleration detected by an acceleration sensor.

7. The method of claim 5, wherein the reference height is set by at least one of the following:

using angles between the photographing height and a top of the at least one wall and between the photographing height and a bottom of the at least one wall;

using information regarding pixels between the photographing height and the top of the at least one wall and information regarding pixels between the photographing height and the bottom of the at least one wall; and using a ratio of a distance from the photographing height to the top of the at least one wall to a distance from the photographing height to the bottom of the at least one wall.

8. The method of claim 1, wherein the generating of the structural drawing comprises:

combining vectors of at least two walls, adjoined, with each other.

9. The method of claim 1, further comprising:

adding position information regarding at least one object to the generated structural drawing according to one or more user inputs.

10. The method of claim 1, wherein the receiving of the image information regarding the at least one wall comprises:

capturing an image of the at least one wall using a camera operatively connected to the electronic device.

11. An electronic device for creating structural drawings, the electronic device comprising:

an image input device configured to generate image information for at least one wall; and at least one processor configured to:

set a reference height for generating vectors for at least one wall, receive the image information on the at least one wall, detect edges of the at least one wall based on the received image, generate vectors for the at least one wall based on the detected edges of the at least one wall and the reference height, and generate the structural drawing based on the generated vectors.

12. The electronic device of claim 11, wherein the at least one processor is further configured to:

extract reference direction information and photographing direction information, and generate the vectors based on the reference direction information, the photographing direction information, and the detected edges.

13. The electronic device of claim 11, wherein the at least one processor is further configured to determine whether the currently received image information is image information of a reference wall to create the structural drawing.

14. The electronic device of claim 13, wherein the at least one processor is further configured to:

generate, in the event that the currently received image information corresponds to image information of a reference wall to generate a structural drawing, a corresponding structural drawing by combining vectors that have been created with each other, and store, in the event that the currently received image information does not correspond to image information of the reference wall to generate the structural drawing, the created vectors and creates vectors for a new wall.

15. The electronic device of claim 11, wherein the at least one processor is further configured to:

set a photographing height at which the electronic device captures images, and set the reference height from the photographing height.

16. The electronic device of claim 15, further comprising:

an acceleration sensor for sensing accelerations, wherein the at least one processor is further configured to calculate the photographing height using accelerations detected by the acceleration sensor.

17. The electronic device of claim 15, wherein the at least one processor is further configured to set the photographing height by using at least one of the following:

angles between the photographing height and a top of the at least one wall and between the photographing height and a bottom of the at least one wall, information regarding pixels between the photographing height and the top of the at least one wall and information regarding pixels between the photographing height and the bottom of the at least one wall, and a ratio of a distance from the photographing height to the top of the at least one wall to a distance from the photographing height to the bottom of the at least one wall.

18. The electronic device of claim 11, wherein the at least one processor is further configured to generate the structural drawing by combining vectors of at least two adjoined walls with each other.

19. The electronic device of claim 11, wherein the at least one processor is further configured to add position information regarding at least one object to the created structural drawing according to one or more user inputs.

20. The electronic device of claim 11, further comprising:

a camera configured to capture one or more images;

wherein the at least one processor is further configured to receive the image information regarding the at least one wall from using the camera.

21. A non-transitory computer-readable storage medium storing instructions that, when executed, cause one or more processors to perform the method of claim 1.

* * * * *